(12) United States Patent
Frias

(10) Patent No.: US 7,314,064 B2
(45) Date of Patent: Jan. 1, 2008

(54) GATE VALVE CABLE ASSEMBLY

(75) Inventor: Luis Ontiveros Frias, Tijuana (MX)

(73) Assignee: Valterra Products, Inc., Mission Hills, CA (US)

( * ) Notice: Subject to any disclaimer, the term of this patent is extended or adjusted under 35 U.S.C. 154(b) by 165 days.

(21) Appl. No.: 11/344,737

(22) Filed: Feb. 2, 2006

(65) Prior Publication Data

US 2007/0175532 A1    Aug. 2, 2007

(51) Int. Cl.
*F16K 31/46* (2006.01)
(52) U.S. Cl. ........................ 137/899; 251/294
(58) Field of Classification Search .............. 137/354, 137/899; 251/244
See application file for complete search history.

(56) References Cited

U.S. PATENT DOCUMENTS

| | | | | |
|---|---|---|---|---|
| 3,015,469 A | * | 1/1962 | Falk | 251/331 |
| 3,954,250 A | * | 5/1976 | Grace | 251/144 |
| 4,469,208 A | * | 9/1984 | Hansen | 192/44 |
| 4,875,504 A | * | 10/1989 | Nicholson | 137/899 |
| 4,907,676 A | * | 3/1990 | Shirdavani | 184/1.5 |
| 5,678,802 A | | 10/1997 | Lunder | |
| 6,364,286 B1 | | 4/2002 | Vegso | |
| 6,408,886 B1 | * | 6/2002 | Milano et al. | 137/899 |

* cited by examiner

*Primary Examiner*—John Fox
(74) *Attorney, Agent, or Firm*—Larry F. Gitlin; Rapkin, Gitlin & Beaumont

(57) ABSTRACT

A valve construction for use with a holding or waste removal tank of a vehicle is provided and includes a gate valve having a valve closure member, and at least one panel having an opening extending from an inside surface to an outside surface connected to the vehicle. Also provided is an axially moveable cable with a first end connected to the gate valve to impart movement to the valve closure member and a second end having a terminus, and a first and second means for securing the second end to the panel. The first means is radially contractible and expandable for penetrating the opening by contracting as it is moved to penetrate through the inside surface of the panel and expanding as it is moved to exit the opening through the outside surface of the panel whereupon it abuts the outside surface. The second means adapts to tightly abut the inside surface of the panel to cooperate with the first means to enable the secure mounting of the second end of the cable to the panel. A handle assembly with a pivotable handle is also provided, and typically is pre-attached to the terminus of the second end before and as the second end is guided through the opening from the inside of the panel.

26 Claims, 6 Drawing Sheets

GATE VALVE CABLE ASSEMBLY

BACKGROUND OF THE INVENTION

1. Field of the Invention

This invention relates generally to the field of gate valves and more particularly, to a device that is employed in conjunction with recreational vehicles ("RV") and the like to enhance and improve the ability of the cable actuator to be installed and secured steadfast to the RV.

2. Description of the Prior Art

Gate valves have a variety of applications, including their use in conjunction with RV holding tanks that contain solid and liquid waste materials. Manual or electrically operated gate valve assemblies include a valve body in which a gate is actuated by a wire cable connected to a valve stem extending from the gate. For manual operation, the cable is generally attached to a handle, which can be manipulated forwards or backwards to move the gate in and out of the valve opening. Valves of the sort being discussed here are now more likely to be operated from a remote and more convenient location, usually somewhere outside the vehicle mounted on a control panel together with water and electrical connections.

The problem in the prior art occurs in the attempt at facilitating installation of the gate valve assembly to the RV. Efficiency and speed is always paramount when producing just about any kind of product, especially vehicles like the RV and its components. Fewer manipulations and steps employed in the installation of components to an RV, such as the gate valve assembly, translates into a savings in time and labor which, in turn, reduces the cost of production and increases the "bottom line."

The prior art teaches a number of devices that are attached to conventional gate valves and their housings, including, for example, those that are disclosed in U.S. Pat. No. 5,678,802 to Lunder and U.S. Pat. No. 6,364,286 B1 to Vegso, et al. These devices are typically called cable assemblies and are connected at one end to the gate valve and at the other end to a handle, which causes the cable to move in and out, to open and close the gate valve.

The gate valve, when used in an RV, is usually installed somewhere underneath the vehicle not far from the source of the waste material, such as a holding tank for waste product produced from a toilet or shower. Installing the handle in close proximity to the gate valve requires a person to get low to the ground, usually beneath the vehicle, possibly even on one's hands and knees to reach in or over to grab the handle and move it in the direction required to open and close the valve. This is inconvenient, messy and sometimes just simply difficult to do. Accordingly, to make the process easier and cleaner for the operator, the handle is typically installed through an opening in a panel integrated into the side or back of the vehicle, and projects and is secured to the outside to permit the user easy access.

Cable assemblies that are pre-attached to the gate valve can easily be installed in the vehicle by simply guiding the free cable end through the opening in the panel, securing the cable end to the panel and then attaching an actuator handle to the cable end on the outside. Methods like this are utilized typically when the length of the cable is already predetermined and, thus, the cable may be pre-attached to the gate valve before installation. Pre-attached assemblies also permit the installer the benefit of having to make only one trip underneath the vehicle for the installation.

However, in order to install pre-attached assemblies of this type, the prior art requires the user to employ a large nut and washer (i.e. larger in diameter than the opening in the panel) to the threaded portion of the cable end protruding outside the panel and then rotate the nut from outside the panel to tighten the joint to secure the cable to the vehicle. The handle then needs to be connected to complete the installation. All this requires a lot of unnecessary time and labor to accomplish.

The improvement of the present invention provides the means to efficiently install a cable assembly, which is already pre-attached at one end to the gate valve, from the inside of the panel to the outside employing fewer steps and taking considerably less time and effort in the process.

SUMMARY OF THE INVENTION

A valve construction for use with a holding or waste removal tank of a vehicle is provided and includes a gate valve having a valve closure member, and at least one panel having an opening extending from an inside surface to an outside surface connected to the vehicle. Also provided is an axially moveable cable with a first end connected to the gate valve to impart movement to the valve closure member and a second end having a terminus, and a first and second means for securing the second end to the panel. The first means is radially contractible and expandable for penetrating the opening by contracting as it is moved to penetrate through the inside surface of the panel and expanding as it is moved to exit the opening through the outside surface of the panel whereupon it abuts the outside surface. The second means adapts to tightly abut the inside surface of the panel to cooperate with the first means to enable the secure mounting of the second end of the cable to the panel. A handle assembly with a pivotable handle is also provided, and typically is pre-attached to the terminus of the second end before and as the second end is guided through the opening from the inside of the panel.

Accordingly, it is an object of the present invention to provide a cable assembly used in conjunction with a gate valve that includes the means for installing the cable assembly and securing it to an RV panel or the like from a position relative to the inside of the panel.

Another object of the present invention is to provide a cable assembly used in conjunction with a gate valve that includes a deformable component, which is fixed onto the end of the cable not already attached to the gate valve and contracts to penetrate the opening in the panel and then expands outside the opening on the exterior surface to abut the panel and cooperate with a locking nut to secure the cable end steadfast to the panel.

Another object of the present invention is to provide a cable assembly used in conjunction with a gate valve that includes a pivotable handle connected to the cable end that pivots from a vertical to a horizontal position.

Still another object of the present invention is to provide a cable assembly used in conjunction with a gate valve that includes a pivotable handle that pivots to the vertical position to enable it to fit through the opening in the panel concurrent with the penetration of the opening by the cable end.

Still another object of the present invention is to provide a cable assembly used in conjunction with a gate valve that is easy and cost effective to produce and install.

Still another object of the present invention is to provide a cable assembly used in conjunction with a gate valve that is easy, quick and efficient to use.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 2:
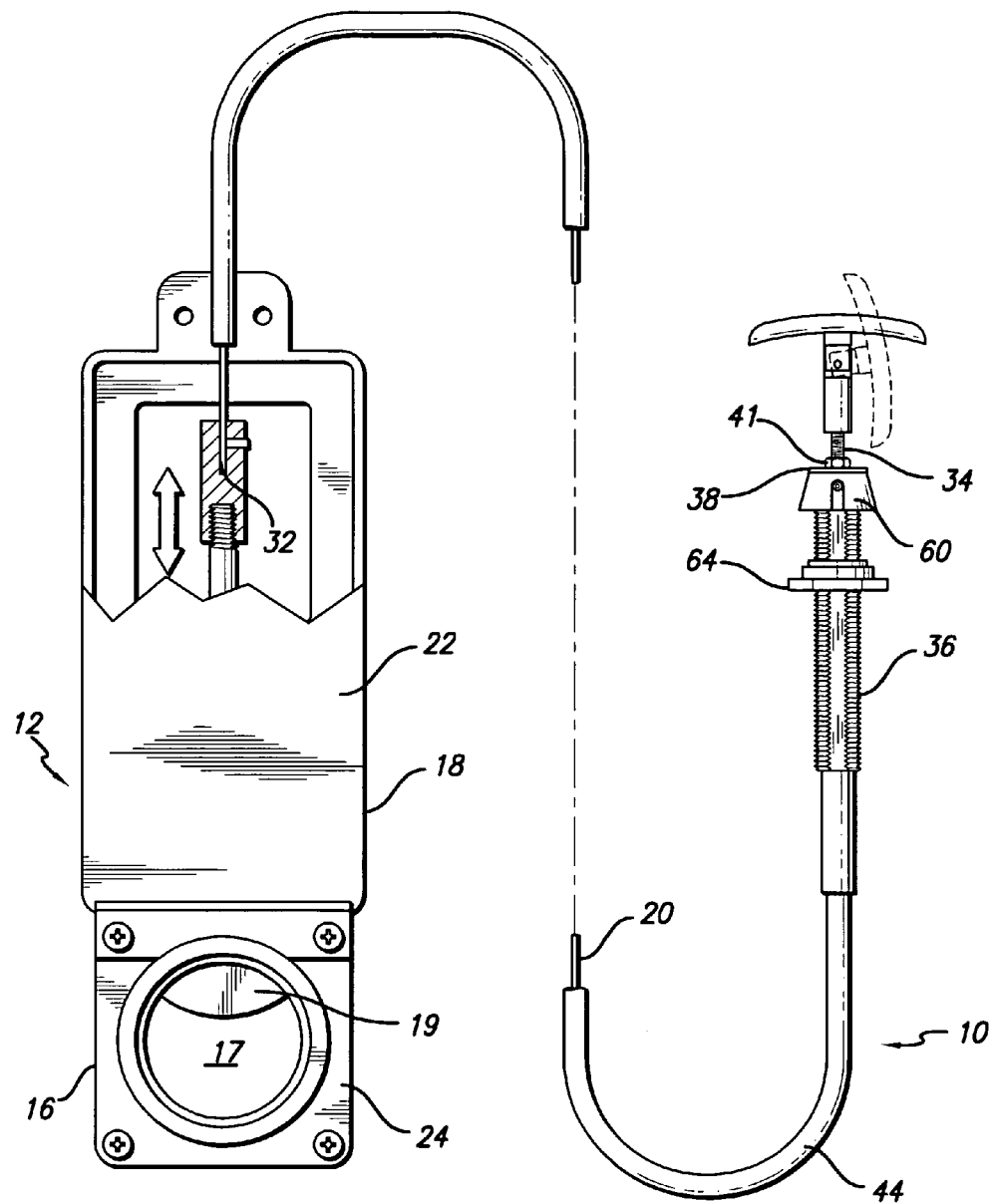
FIG. 2 is a front perspective view of the gate valve cable assembly attached at one end to an encased gate valve in accordance with the present invention.
Figures 3, 3A, 3B:
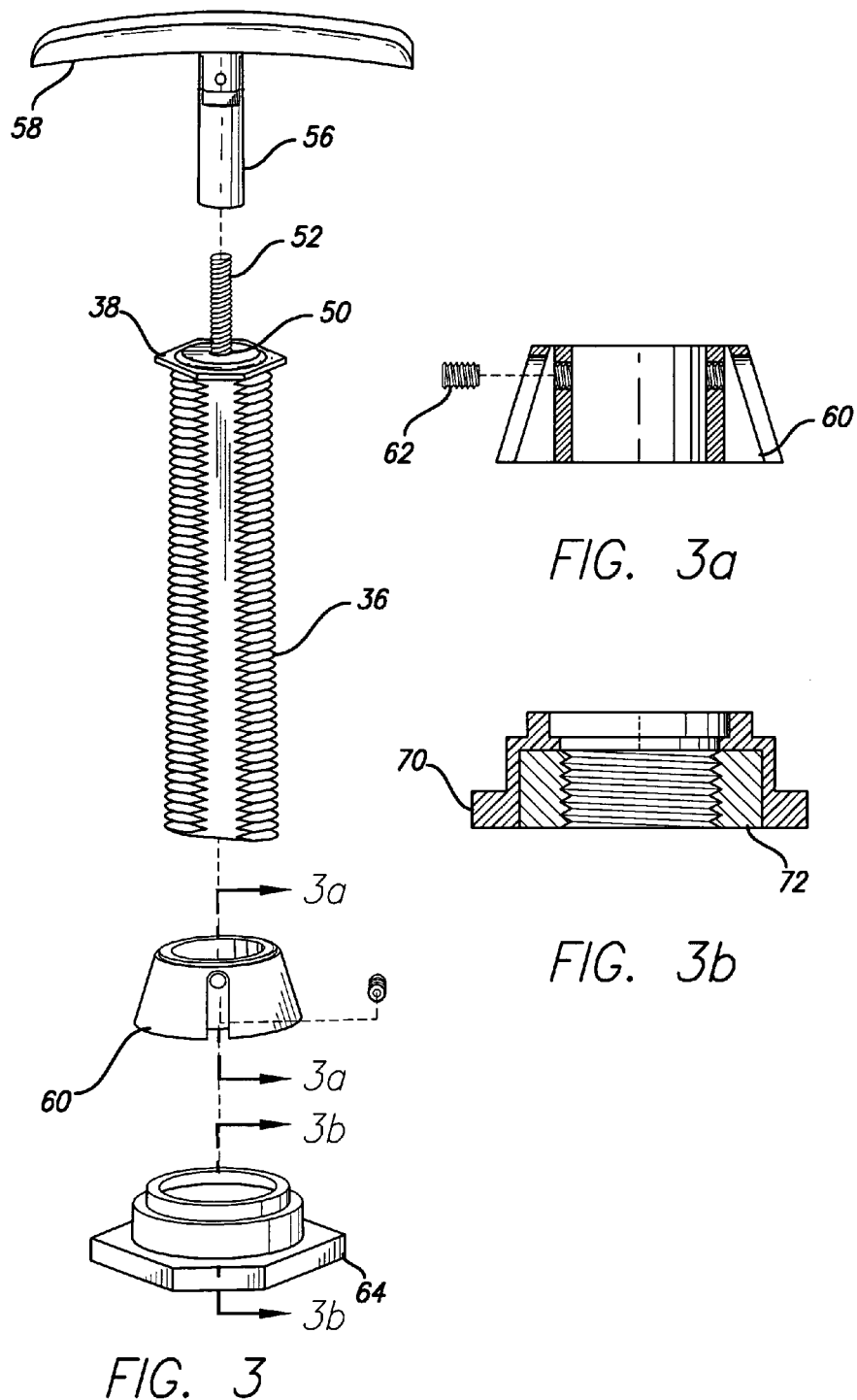
FIG. 3 is an exploded view of the principal section of the preferred embodiment of the gate valve cable assembly in accordance with the present invention.
FIG. 3a is a cross-sectional view of the compressible component of the gate valve cable assembly shown along lines 3a-3a of FIG. 3 in accordance with the present invention.
FIG. 3b is a cross-sectional view of the threaded nut component of the gate valve cable assembly shown along lines 3b-3b of FIG. 3 in accordance with the present invention.
Figure 4A:
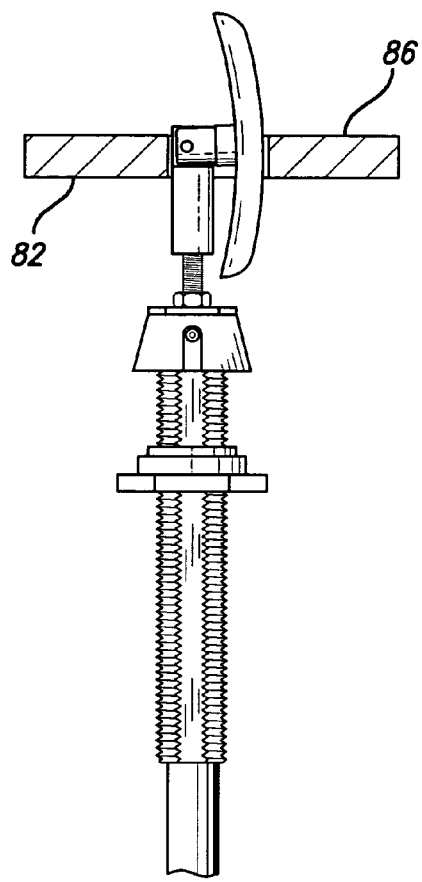
FIG. 4a is a perspective view of the preferred embodiment of the gate valve cable assembly shown in the initial stage of penetrating the opening in a panel of a recreational vehicle in accordance with the present invention.
Figure 4B:
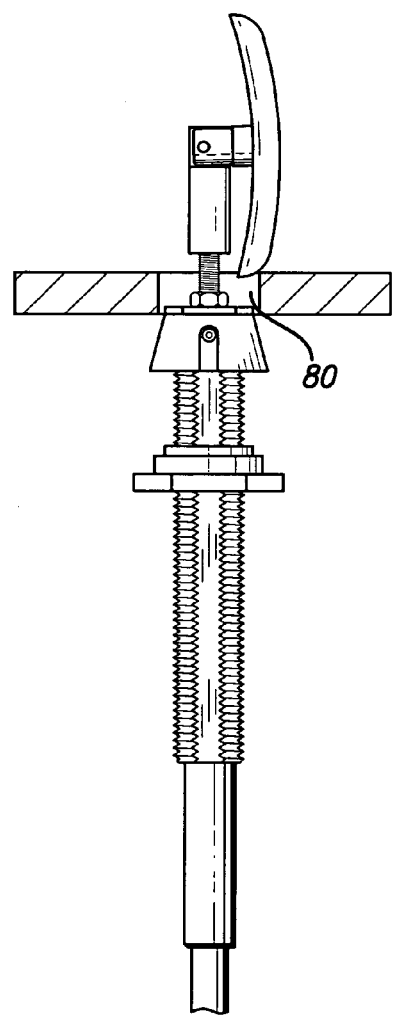
FIG. 4b is a perspective view of the embodiment of the gate valve cable assembly of FIG. 4a shown with the handle portion exiting the panel opening in accordance with the present invention.
Figure 4C:
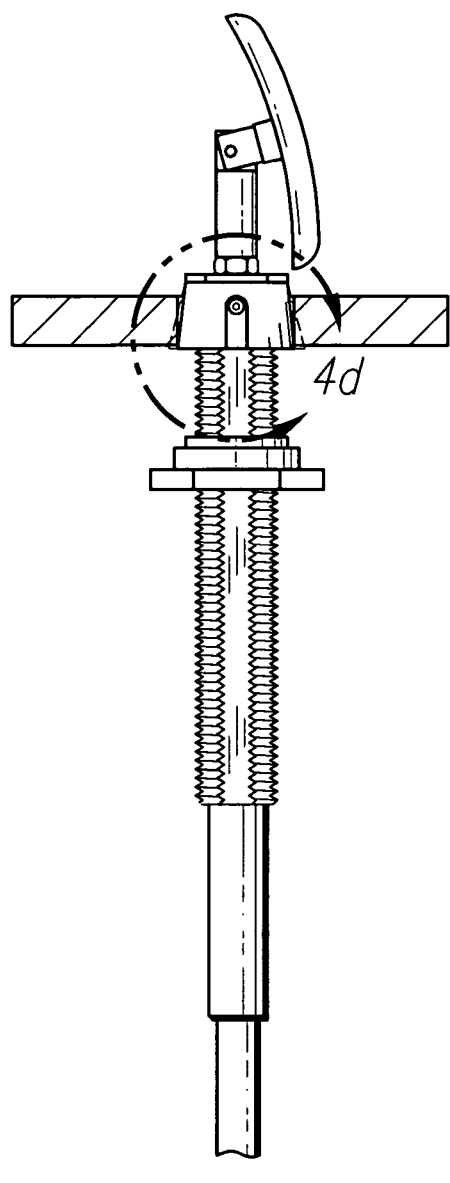
FIG. 4c is a perspective view of the embodiment of the gate valve cable assembly of FIGS. 4a and 4b shown with the compressible component contracting as it pushes through the panel opening in accordance with the present invention.
Figure 4D:
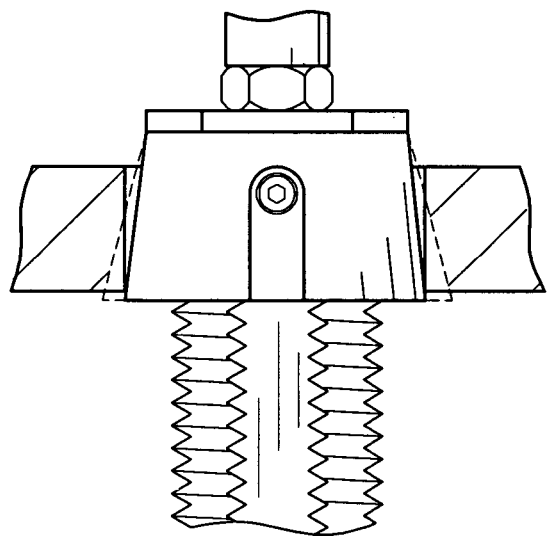
FIG. 4d is an enlarged view of the encircle section of the gate valve assembly shown in FIG. 4c indicated by reference 4d in accordance with the present invention.
Figure 4E:
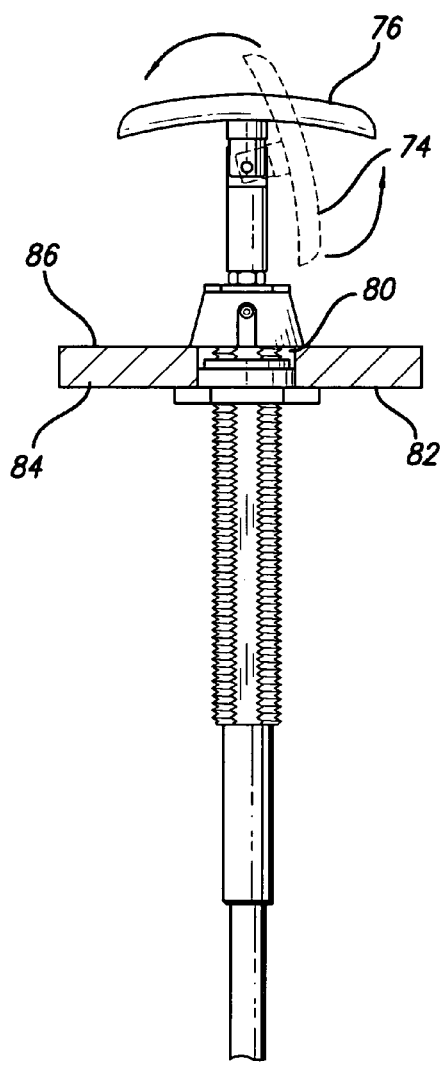
FIG. 4e is a perspective view of the preferred embodiment of the gate valve cable assembly illustrated in the immediately preceding FIG. 4 drawings shown affixed to the recreational vehicle panel, with the handle being pivoted horizontally in accordance with the present invention.

FIG. 2 illustrates the preferred embodiment of the gate valve cable assembly of the present invention, which is designated generally as 10. Assembly 10 is provided as a principal component of a gate valve assembly 12, which is employed as a means to control the discharge of waste from, for example, a recreational vehicle 14 ("RV") into a sewer or septic tank (not shown). Valve assembly 12 includes a gate valve 16, having a flow passageway 17 and a valve closure member 19, a clamp assembly 18, a cable 20 and cable assembly 10.

The axially moveable cable 20 is connected to the valve closure member 19 at one end 32 within upper housing member 22 and is used to impart movement to valve closure member 19 between upper housing member 22 and lower housing member 24 to open and close flow passageway 17.

Cable 20 is covered along almost its entire length by a sleeve 44, which is provided to impart strength to cable 20 and act as a protective covering and is comprised of a resilient synthetic or natural material.

The opposite end 34 of cable assembly 10 consists of an elongated sleeve 36, typically threaded and fixed, and comprised of metal or any other suitable material. A metal stop or fixed nut 38 is attached at end 41 of sleeve 36. Protruding through opening 50 in nut 38 is threaded end 52 of cable 20. End 52 may be formed from end 34 of cable 20 or consist of a separately attached piece. In either event, end 34 is typically threaded to receive the mated threaded connector 56 attached to pivotable handle 58.

Attached near end 34 and fixed adjacent nut 38 is compressible or resilient cone shaped collar member 60, which may be held tightly secured to sleeve 36 by an allen screw 62 or any other suitable means. In the alternative, cone-shaped collar member 60 does not require a separate screw or similar means to secure it to sleeve 36. Spaced apart from collar member 60 and threadedly connected to sleeve 36 is nut 64, which can be comprised entirely of metal or a combination of any other materials suitable for this purpose. Nut 64 comprises a resilient frame piece 70 and a threaded inside nut 72, which is typically comprised of metal.

Handle 58 is attached at end 34 and is capable of pivoting from a vertical position 74 to a horizontal position 76 where it may lock into place using any suitable means for this purpose.

Figure 1:
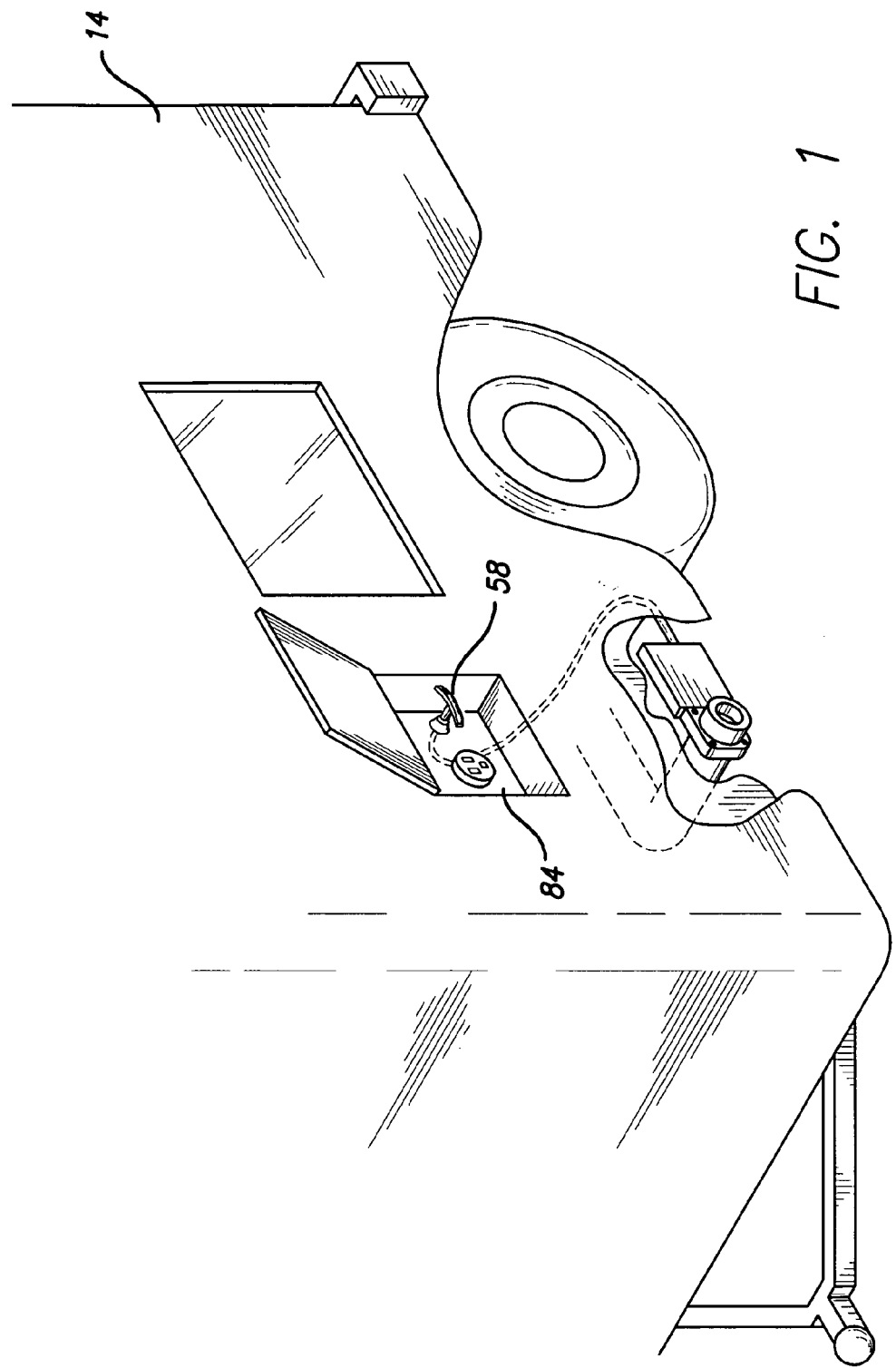
FIG. 1 is a perspective view of a recreational vehicle employing the gate valve cable assembly in accordance with the present invention.

In practice, gate valve cable assembly 10 may be pre-attached to valve assembly 12, as installed in any appropriate place inside or underneath the RV, as illustrated, for example, in FIG. 1. End 34 of cable assembly 10 may then be installed to the RV by inserting the end, handle 58 first in vertical position 74, through opening 80 formed into interior surface 82 of panel 84. As the insertion of end 34 through opening 80 progresses and collar member 60 comes into physical contact with opening 80, member 60 begins to compress to enable it to fit through the opening 80. When member 60 progresses entirely through opening 80 and comes out the other side on the exterior surface 86 of panel 84, it relaxes and expands to a diameter greater than the diameter of opening 80 to preclude that section of cable assembly 10 from back sliding into opening 80. Nut 64 is then rotated along threaded sleeve 36 in the direction of panel 84 until it becomes tight and secured against panel 84 securing the cable assembly to the panel in cooperation with collar member 60 fixed on the other side of the opening. A separate nut 90 may be used behind nut 64 to enhance the strength of that connection.

When cable assembly 10 is firmly affixed to panel 84, handle 58 may be pivoted or rotated from vertical position 74 to horizontal position 76 and, if desired, locked or snapped into place using any suitable means for this purpose. The pulling and pushing of handle 58 imparts axial movement to cable 20 and valve closure member 19 to open and close flow passageway 17.

Figure 5:
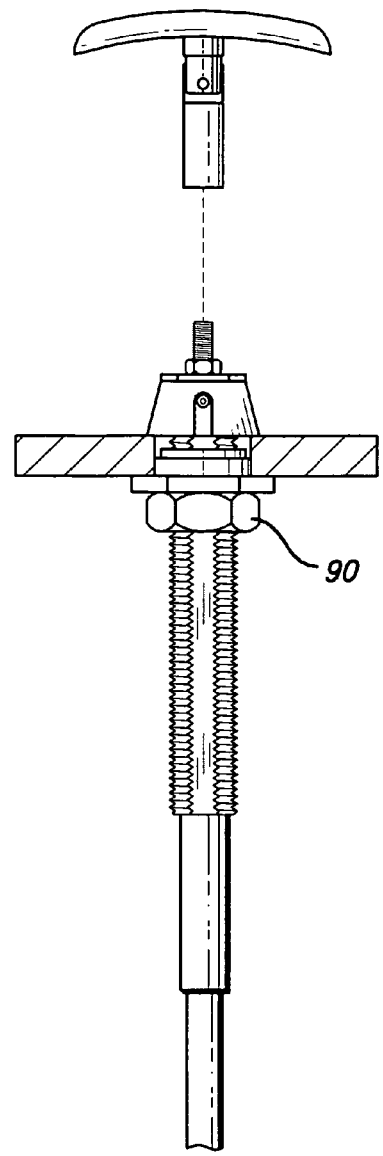
FIG. 5 is an alternative embodiment of the gate valve cable assembly shown affixed to the panel of the recreational vehicle with the handle being attached from the exterior side of the panel in accordance with the present invention.

In its alternative embodiment (FIG. 5), handle 58 may be attached to the cable end after the end penetrates the opening and is affixed to RV.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. In a valve construction for use with a holding or waste removal tank of a vehicle comprising,
a gate valve having a valve closure member;
at least one panel with an inside surface and an outside surface connected to said vehicle, said panel having at least one opening;
an axially movable cable with a first end connected to said gate valve to impart movement to said valve closure member, and a second end having a terminus and a first and second means for securing said second end to said panel, said first means being radially contractible and expandable for penetrating said opening by contracting as it is moved to penetrate through the inside surface of said panel and expanding as it is moved to exit said opening through the outside surface of said panel whereupon it abuts said outside surface, said second means adapted to tightly abut said inside surface of said panel to cooperate with said first means to enable secure mounting of said second end to said panel.

2. The invention of claim 1 wherein said second end includes a threaded sleeve.

3. The invention of claim 2 wherein said first means comprises a deformable nut engaged upon said threaded sleeve.

4. The invention of claim 3 wherein said deformable nut comprises a threaded opening for engaging said threaded sleeve.

5. The invention of claim 3 wherein said deformable nut comprises a deformable exterior member and a generally rigid interior member.

6. The invention of claim 3 wherein said deformable exterior member of said deformable nut includes one or more spaced slotted openings.

7. The invention of claim 5 wherein said threaded sleeve includes a fixed nut at one end for engaging and securing said deformable nut in abutting relation.

8. The invention of claim 3 wherein said second means comprises a second nut spaced apart from said deformable nut and adapted to engage and rotate about said threaded sleeve until it tightly seats against said inside surface of said panel.

9. The invention of claim 1 comprising a handle assembly having a handle member and a support rod, said support rod having a first end that connects to said terminus and a second end that connects to said handle member.

10. The invention of claim 9 wherein said handle member is pivotable about said second end of said support rod.

11. The invention of claim 10 wherein said handle member is pivotable from a generally horizontal to a generally vertical position and a generally vertical position to a generally horizontal position relative to said second end of said support rod.

12. The invention of claim 5 wherein said deformable exterior member and said generally rigid interior member are joined.

13. The invention of claim 12 wherein said generally rigid interior member includes a threaded opening.

14. The invention of claim 8 wherein said second nut includes a threaded insert.

15. The invention of claim 1 wherein said first and second means are comprised of a resilient material.

16. The invention of claim 14 wherein said threaded insert is comprised of metal.

17. The invention of claim 10 wherein said handle member pivots to a generally vertical position relative to said second end of said axially movable cable to enable said second end and second handle member to penetrate through said opening in said panel from said inside surface to said outside surface whereupon said handle member is generally pivoted horizontally.

18. The invention of claim 10 wherein said handle member is pivoted generally horizontally to a fixed position after it penetrates said opening to said outside surface of said panel.

19. The invention of claim 9 wherein said handle assembly is removable from said terminus.

20. In a valve construction for use with a holding or waste removal tank of a vehicle comprising,
a gate valve having a valve closure member;
at least one panel with an inside surface and an outside surface connected to said vehicle, said panel having at least one opening;
an axially movable cable with a first end connected to said gate valve to impart movement to said valve closure member, and a second end having a terminus and a first and second means for securing said second end to said panel, said first means being radially contractible and expandable for penetrating said opening by contracting as it is moved to penetrate through the inside surface of said panel and expanding as it is moved to exit said opening through the outside surface of said panel whereupon it abuts said outside surface, said second means adapted to tightly abut said inside surface of said panel to cooperate with said first means to enable secure mounting of said second end to said panel.

21. The invention of claim 20 comprising a handle, said handle being attached to the terminus of said second end of said axially movable cable.

22. The invention of claim 21 wherein said handle is pivotable about said terminus.

23. The invention of claim 22 wherein said handle is pivotable from a generally horizontal to a generally vertical position and a generally vertical position to a generally horizontal position relative to said terminus.

24. The invention of claim 23 wherein said handle is pivoted to a generally vertical position relative to said terminus to enable said second end and said handle to penetrate through said opening in said panel from said inside surface to said outside surface whereupon said handle may be pivoted generally horizontally.

25. The invention of claim 24 wherein said handle may be pivoted generally horizontally to a fixed position after it penetrates said opening to said outside surface of said panel.

26. The invention of claim 21 wherein said handle is removable from said terminus.

* * * * *